(12) United States Patent
Offord

(10) Patent No.: US 8,672,341 B2
(45) Date of Patent: Mar. 18, 2014

(54) HINGING MECHANISM FOR WHEELED DEVICE

(75) Inventor: David Leslie Offord, Maidenhead (GB)

(73) Assignee: SCS (London) Limited, Hertfordshire (GB)

( * ) Notice: Subject to any disclaimer, the term of this patent is extended or adjusted under 35 U.S.C. 154(b) by 72 days.

(21) Appl. No.: 13/123,550

(22) PCT Filed: Sep. 24, 2009

(86) PCT No.: PCT/EP2009/062405
§ 371 (c)(1),
(2), (4) Date: Aug. 18, 2011

(87) PCT Pub. No.: WO2010/040644
PCT Pub. Date: Apr. 15, 2010

(65) Prior Publication Data
US 2011/0291389 A1    Dec. 1, 2011

(30) Foreign Application Priority Data
Oct. 10, 2008  (GB) .................................. 0818605.8

(51) Int. Cl.
*B62B 7/06*    (2006.01)

(52) U.S. Cl.
USPC ......... 280/650; 280/642; 280/658; 280/47.38

(58) Field of Classification Search
USPC ........... 280/638, 35, 639, 642, 643, 647, 648, 280/650, 651, 656, 657, 658, 47.34, 47.38, 280/47.41
See application file for complete search history.

(56) References Cited

U.S. PATENT DOCUMENTS

| | | | | |
|---|---|---|---|---|
| 4,880,331 A * | 11/1989 | Zun | ................................. | 403/24 |
| 5,028,061 A * | 7/1991 | Hawkes | ...................... | 280/47.4 |
| 5,039,118 A * | 8/1991 | Huang | ..................... | 280/47.371 |
| 5,069,474 A * | 12/1991 | Tai | ................................ | 280/658 |
| 5,988,012 A * | 11/1999 | Arnoth | .......................... | 74/527 |
| 6,152,465 A * | 11/2000 | Shieh | ............................ | 280/62 |
| 6,345,836 B1 * | 2/2002 | Wu | .............................. | 280/651 |
| 6,805,513 B2 * | 10/2004 | Marquina | ..................... | 403/107 |
| 6,886,852 B2 * | 5/2005 | Cheng et al. | .................. | 280/651 |
| 6,910,708 B2 * | 6/2005 | Sack et al. | .................... | 280/642 |
| 6,948,197 B1 * | 9/2005 | Chen | ................................ | 5/93.1 |
| 7,278,652 B2 * | 10/2007 | Riedl et al. | .................... | 280/642 |

(Continued)

FOREIGN PATENT DOCUMENTS

| | | |
|---|---|---|
| DE | 3838925 A1 | 5/1989 |
| DE | 9314000 U1 | 12/1993 |
| EP | 0702162 A | 3/1996 |

*Primary Examiner* — Jeffrey J Restifo
*Assistant Examiner* — Erez Gurari
(74) *Attorney, Agent, or Firm* — The Weintraub Group, P.L.C.

(57) ABSTRACT

A vehicle frame assembly (4) including a hinge device (16), the hinge device (16) having first and second hub devices (22) and a third hub device (22) interposed between the first and second hub devices (22), the first and second hub devices (22) releasably engage with the third hub device (24) for locking the vehicle frame assembly (4) in an erected condition, wherein the first and second hub devices (22) have inwardly-projecting lugs (26) about their periphery and the third hub device (24) includes at its periphery recesses (28), the recesses (28) and the inwardly-projecting lugs (26) arranged to loosely interdigitate in the erected condition, and wherein the inwardly-projecting lugs (26) comprise inwardly-projecting ramped portions and the third hub device (24) comprises, bounding the recesses (28), corresponding outwardly-projecting ramped surface portions (40).

10 Claims, 18 Drawing Sheets

(56) References Cited

U.S. PATENT DOCUMENTS

Figure 1:
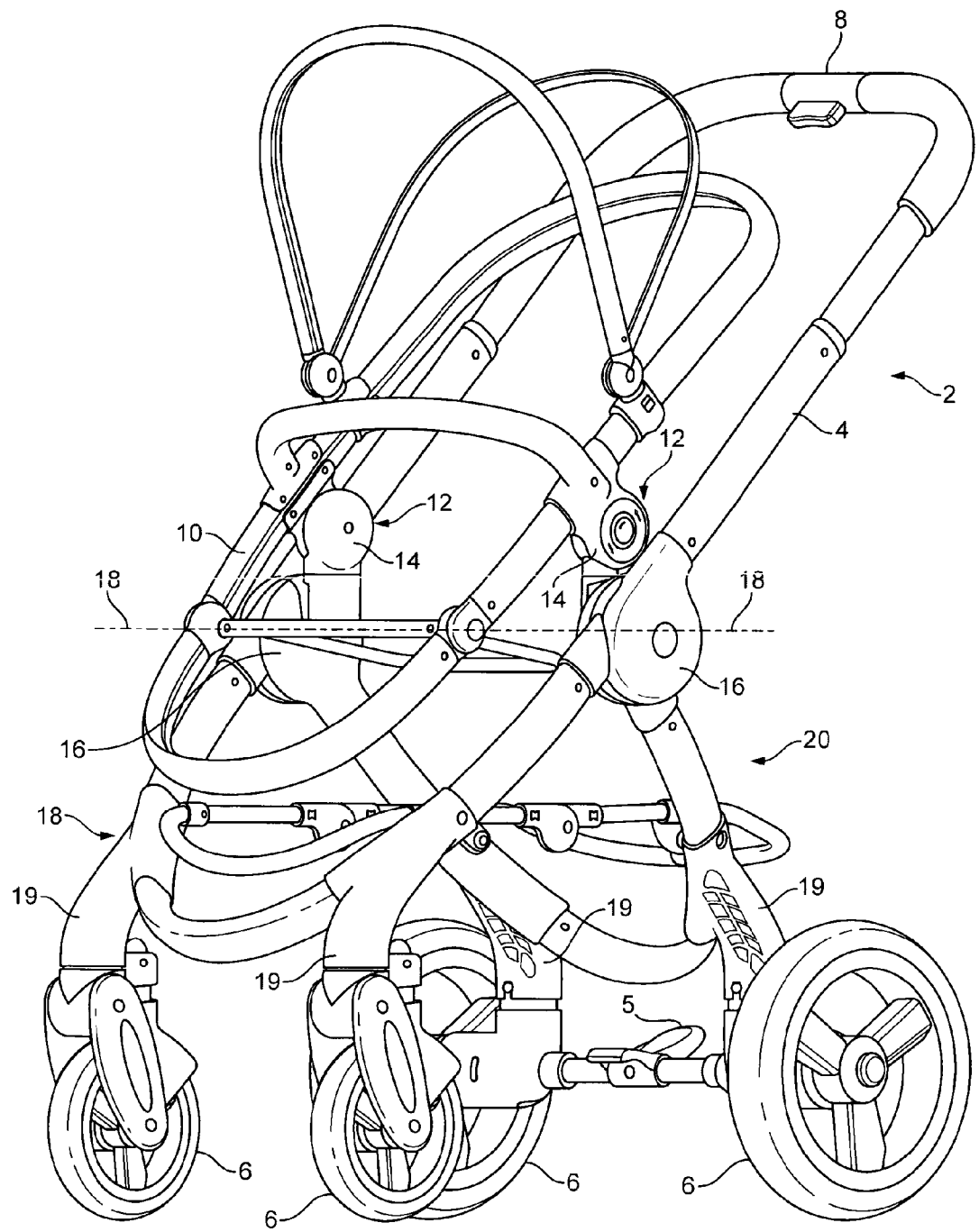

| | | | |
|---|---|---|---|
| 7,617,569 B2 * | 11/2009 | Liao | 16/334 |
| 7,631,575 B2 * | 12/2009 | Gard et al. | 74/530 |
| 7,770,912 B2 * | 8/2010 | Liao | 280/651 |
| 7,862,053 B2 * | 1/2011 | Liao | 280/47.34 |
| 8,038,161 B2 * | 10/2011 | Wang | 280/87.051 |
| 8,132,978 B2 * | 3/2012 | Franklin et al. | 403/96 |
| 8,376,463 B2 * | 2/2013 | Cooper et al. | 297/361.1 |
| 2006/0261565 A1 * | 11/2006 | Tan | 280/47.38 |
| 2008/0061533 A1 * | 3/2008 | Li | 280/642 |
| 2011/0241315 A1 * | 10/2011 | Liao | 280/651 |
| 2011/0291389 A1 * | 12/2011 | Offord | 280/650 |

* cited by examiner

HINGING MECHANISM FOR WHEELED DEVICE

This invention relates to apparatus for a vehicle and a method of using the vehicle, the vehicle being, in particular, an infant's pushchair.

According to a first aspect of the present invention, there is provided apparatus comprising a vehicle frame assembly including a hinge device having a hinge axis, said hinge device having first and second hub devices movable co-axially with respect to said hinge axis and a third hub device interposed between the first and second hub devices and moveable about said hinge axis, the first and second hub devices releasably engage with the third hub device for locking said vehicle frame assembly in an erected condition, wherein the first and second hub devices have inwardly-projecting lugs about their periphery and said third hub device includes at its periphery recesses, said recesses and said inwardly-projecting lugs arranged to loosely interdigitate in the erected condition, and wherein said inwardly-projecting lugs comprise inwardly-projecting ramped portions and said third hub device comprises, bounding said recesses, corresponding outwardly-projecting ramped surface portions, the arrangement being such that the first and second hub devices are moveable as aforesaid by movement of the third hub device about said hinge axis.

According to a second aspect of the present invention, there is provided a method comprising providing a vehicle frame assembly, locking the assembly in an erected condition, said locking including causing first and second hub devices of a hinge device of the frame assembly to engage releasably a third hub device interposed between the first and second hub devices, wherein the first and second hub devices have inwardly-projecting lugs about their periphery and said third hub device includes at its periphery recesses, said recesses and said inwardly-projecting lugs arranged to loosely interdigitate in the erected condition, and wherein said inwardly-projecting lugs comprise inwardly-projecting ramped portions and said third hub device comprises, bounding said recesses, corresponding outwardly-projecting ramped surface portions and unlocking the assembly by causing movement of said third hub device about a hinge axis thereby causing movement of the first and second hub devices co-axially with respect to said hinge axis, such movement of the hub devices releasing the first and second hub devices from a locking engagement with the third hub device.

Owing to these two aspects, it is relatively easy to lock the frame assembly into an erected condition, ready for use.

The vehicle frame assembly is, advantageously, a frame assembly for a wheeled vehicle, such as a pushchair for an infant.

Preferably, the first and second hub devices are laterally disposed on respective opposite sides of the third hub device. The hinge device preferably also comprises a releasing mechanism attached to the third central hub device which, upon actuation, causes movement of the first and second lateral hub devices co-axially away from each other so that they no longer lockably engage with the third central hub device, such that the hinge device can be rotated about its hinge axis of rotation and the frame assembly can be put into a non-erected state, i.e. a semi-collapsed/folded or collapsed/folded condition. Advantageously, the releasing mechanism is operated by a part of the frame assembly, for example the handle portion of the frame assembly for a pushchair.

Most advantageously, there are two such hinge devices located on respective opposite sides of the frame assembly.

The use of such a hinge device ensures that, in the erected position, the frame assembly is fully supported, without the need for additional structural support elements on the frame assembly. This has not only an aesthetic advantage, but also a mechanical advantage in that there are relatively few parts to the frame assembly which makes it relatively lighter in weight and is of a relatively simple construction making manufacturing the frame assembly relatively easy and cost-effective.

According to a third aspect of the present invention, there is provided a mounting device of a child-carrying unit, said mounting device including first and second actuating devices, the first and second actuating devices being located in a single actuating region of said mounting device, said first actuating device being substantially surrounded by said second actuating device, said mounting device being for attaching releasably to a mounting region of an interface portion of a vehicle frame assembly.

According to a fourth aspect of the present invention, there is provided a method of mounting a child-carrying unit on a vehicle frame assembly, comprising releasably mounting on a mounting region of an interface portion of said assembly a mounting device of said child carrying unit, and subsequently actuating one or both of first and second actuating devices at a single actuating region on said mounting device, wherein the first actuating device is substantially surrounded by the second actuating device.

Owing to these two aspects, operation of functions relating to the child-carrying unit, particularly to the mounting device, via the first and second actuating devices is conveniently located in a single region of the mounting device.

Advantageously, the first and second actuating devices are for operating the releasing of the mounting device from the mounting region of the interface portion and the adjusting of the position of the child-carrying unit about a substantially horizontal axis passing through the single actuating region.

Most advantageously, there are two interface portions on respective opposite sides of the frame assembly and there are two corresponding mounting devices located on corresponding respective opposite sides of the child-carrying unit.

Preferably, the first and second actuating devices are pressable buttons. In a preferred embodiment, the first actuating device is a circular button and the second actuating device is a ring-form button completely surrounding the first actuating device.

It is possible, by way of a sub-frame assembly releasably attached to the frame assembly to have two pairs of interface portions for mounting first and second child-carrying units in an echelon formation.

According to a fifth aspect of the present invention, there is provided apparatus comprising a vehicle frame assembly having upper and lower portions, said lower portion having a forwardly-projecting sub-portion and a rearwardly-projecting sub-portion, said forwardly-projecting sub-portion and said rearwardly-projecting sub-portion being substantially identical to each other, wherein differing sets of wheels can be connected to said forwardly-projecting sub-portion and to said rearwardly-projecting sub-portion.

Owing to this aspect of the invention, manufacture of the vehicle frame assembly is relatively simplified by having the two sub-portions of the lower portion substantially identical.

In this way, only one set of tooling and moulds are required for forming the lower sub-portions. Thus, there is considerable saving on the cost of manufacture of the frame assembly.

The vehicle frame assembly is, advantageously, a frame assembly for a wheeled vehicle, such as a pushchair. Preferably, the wheels to be connected to the forwardly-projecting sub-portion are able to swivel about a substantially vertical axis, as is conventional.

According to a sixth aspect of the present invention, there is provided apparatus comprising a vehicle frame assembly, a hinge arrangement of said assembly, and an elongate actuator connected to a part of said hinge arrangement for actuating folding of said frame assembly about an axis of said hinge arrangement.

According to a seventh aspect of the present invention, there is provided a method of folding an erected vehicle frame assembly having a hinge arrangement, comprising folding said frame assembly about a first axis, and pulling an elongate actuator connected to said hinge arrangement, thereby folding said frame assembly about a second axis.

Owing to these two aspects of the invention, an elongate actuator can be provided on the vehicle frame assembly for folding the vehicle frame assembly from an erected state to a folded state in a relatively simple manner.

Preferably, each hinge arrangement comprises a primary hinge device and a secondary hinge device and there are two primary hinge devices of a primary frame and two secondary hinge devices of a secondary frame connected to the primary frame, the primary and secondary hinge devices being located on respective opposite sides of the respective primary and secondary frames. The elongate actuator is, advantageously, an elongate strap, each end of the strap being connected to respective secondary hinge devices. Once the primary hinge devices have been actuated to become folded, the actuating strap can be pulled in a direction to cause folding about the secondary hinge devices. Continued pulling of the strap will complete the folding or collapsing of the complete vehicle frame assembly.

Furthermore, after the strap has been used to collapse the vehicle frame assembly, it can then be used to carry the vehicle frame assembly if the strap is of a sufficient length.

In a preferred embodiment, the secondary frame is a basket frame assembly which supports a basket of a pushchair.

According to an eighth aspect of the present invention, there is provided apparatus comprising an adaptor device for mounting a child-carrying unit to a vehicle frame assembly, said adaptor device including a mounting portion for mounting said adaptor device into a receptor on said frame assembly and a receiving portion substantially identical to said receptor for releasably receiving said child-carrying unit, wherein one of said receiving portion and said mounting portion is at least twice the length of the other of said receiving portion and said mounting portion.

Owing to this aspect of the invention, since the adaptor device which has a relatively long receiving portion compared to the mounting portion, a pair of such adaptor devices are used to mount a child-carrying unit on a vehicle frame assembly, the child-carrying unit can be positioned in an elevated position in relation to the frame assembly. This ensures that a young infant, in particular, is closer to the user of the frame assembly, such as the infant's parent.

According to a ninth aspect of the present invention, there is provided apparatus comprising a vehicle frame assembly which includes an interface portion having first and second mounting regions for releasably mounting on said assembly, one behind the other, respective first and second child-carrying units in an echelon formation, wherein the distance between the first and second mounting regions is readily changeable.

According to a tenth aspect of the present invention, there is provided a method of mounting first and second child-carrying units one behind the other, in an echelon formation, on a vehicle frame assembly, comprising mounting on a first mounting region of an interface portion of said assembly the first child-carrying unit, mounting on a second mounting region of said interface portion the second child-carrying unit at a higher level than the first unit, and readily changing the distance between the first and second mounting regions.

Owing to these two aspects, since the distance between the two mounting regions and thus the child-carrying units can be readily changed, as an infant grows, especially one who occupies the lower unit in the echelon formation, the distance between the units can be increased in order to maintain a sufficient level of comfort. This also extends the useful life of the vehicle frame assembly.

Preferably, the interface portion is a sub-frame assembly detachably connected to the frame assembly and may be in one or more parts, for example, two parts. In order that the frame assembly remains stable and safe to use, it is preferable that the adjustment of the distance between the mounting regions be within tolerable limits so that the mounting regions remain as close as reasonably possible to a vertical plane in which the centre of gravity of the vehicle frame assembly lies.

Advantageously, the distance between the mounting regions is adjustable by way of a telescopic device associated with the higher level mounting region of the echelon formation, such that the horizontal distance between the mounting regions is adjustable.

According to an eleventh aspect of the present invention, there is provided apparatus comprising a vehicle frame assembly convertible between an erected and a folded condition and including a hinge device whereby said frame assembly is converted between the erected and folded conditions and having first and second portions which comprise corresponding first and second channel sections, the first portion being movable relative to the second portion, wherein, in the erected condition, the first and second channel sections align to form a channel, the apparatus further comprising a releasable device, the releasable device including a lug which is closely received by said channel, thereby extending through both the first and second channel sections.

According to a twelfth aspect of the present invention, there is provided a method comprising converting a vehicle frame assembly into an erected condition by turning the frame assembly about an axis of a hinge device, the hinge device having first and second portions which comprise corresponding first and second channel sections, the first portion being movable about said axis relative to the second portion, aligning the first and second channel sections to form a channel and inserting a lug of a releasable device into said channel to be closely received thereby and preventing movement of the first portion relative to the second portion.

Owing to these two aspects, a lug can be placed into a channel extending across first and second portions of a hinge device and thereby prevent movement of the first portion relative to the second portion.

Advantageously, the lug is connected to a releasably mountable device in the form of a child-carrying unit. The lug-in-channel arrangement, when the frame assembly is in the erected condition and when the child-carrying unit is mounted thereon, provides a safety mechanism by preventing movement of the first portion of the hinge device relative to the second portion if the hinge device is accidentally or inadvertently put into a condition where turning of the hinge device is possible. Such prevention of relative movement is achieved by the lug extending across both the first and second channel sections.

Figure 2:
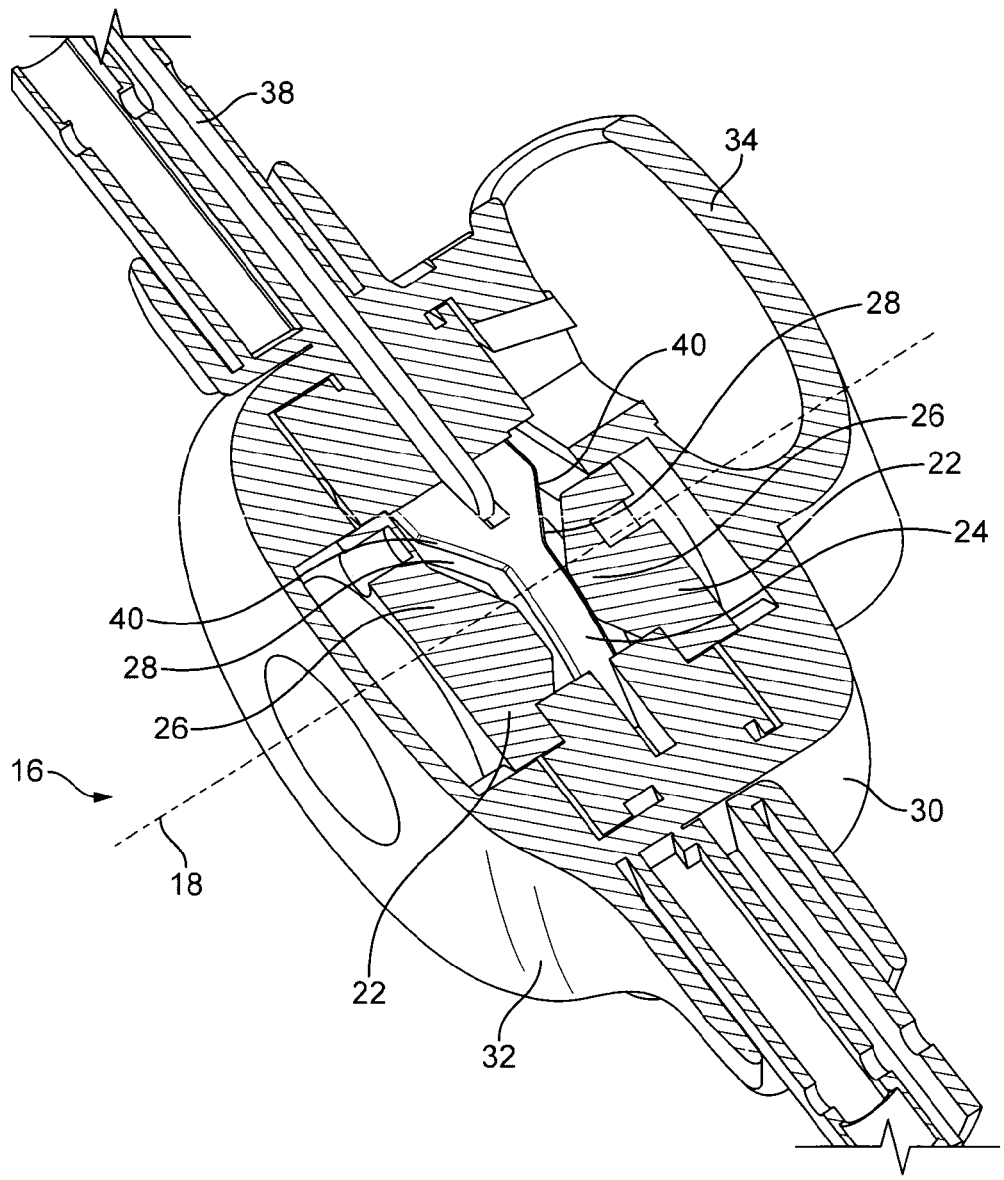
Figure 3:
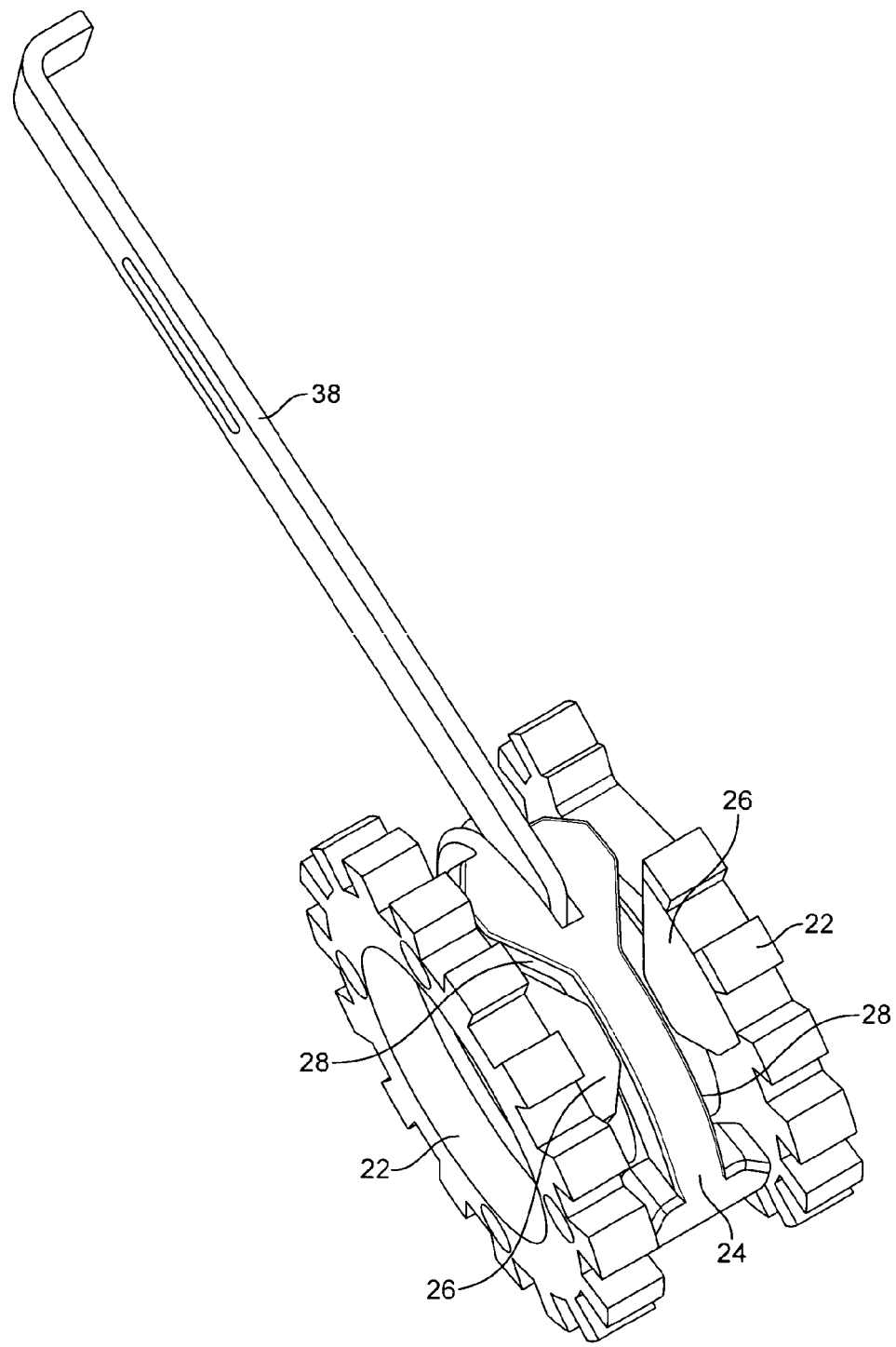
Figure 4:
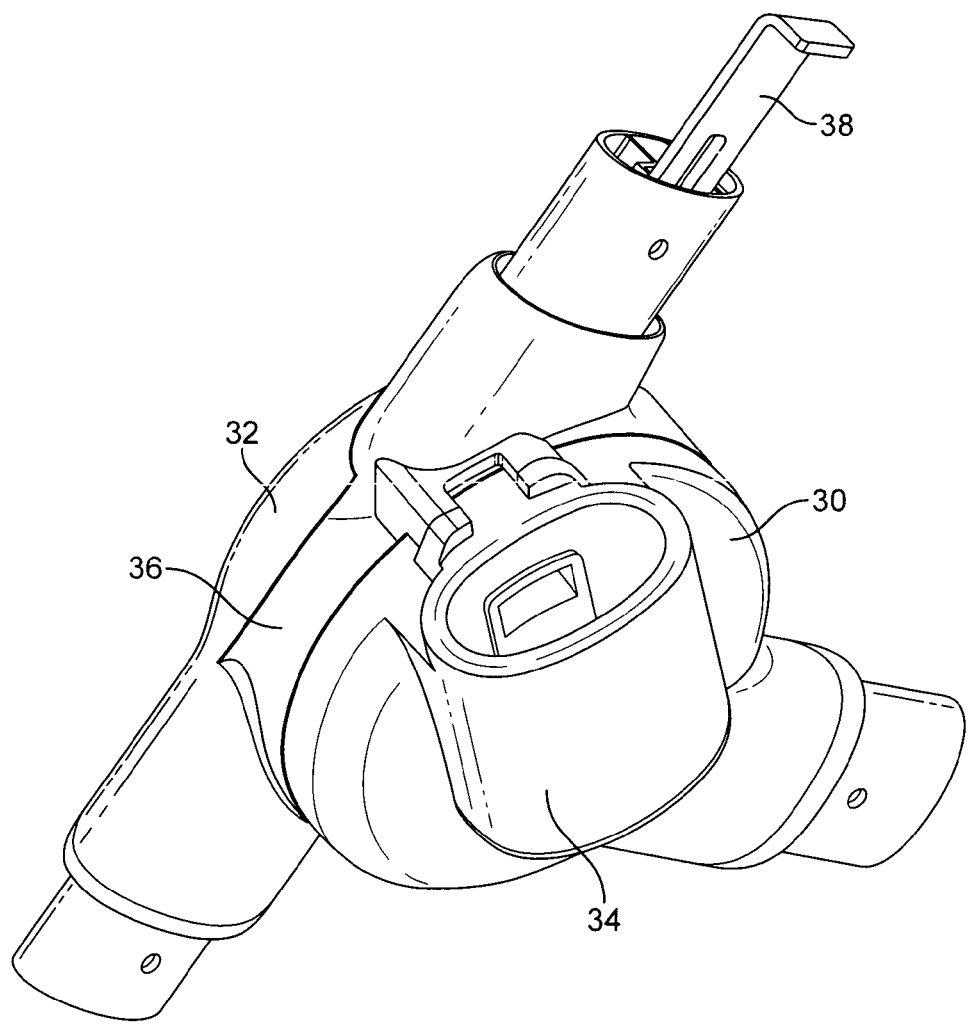
Figure 5:
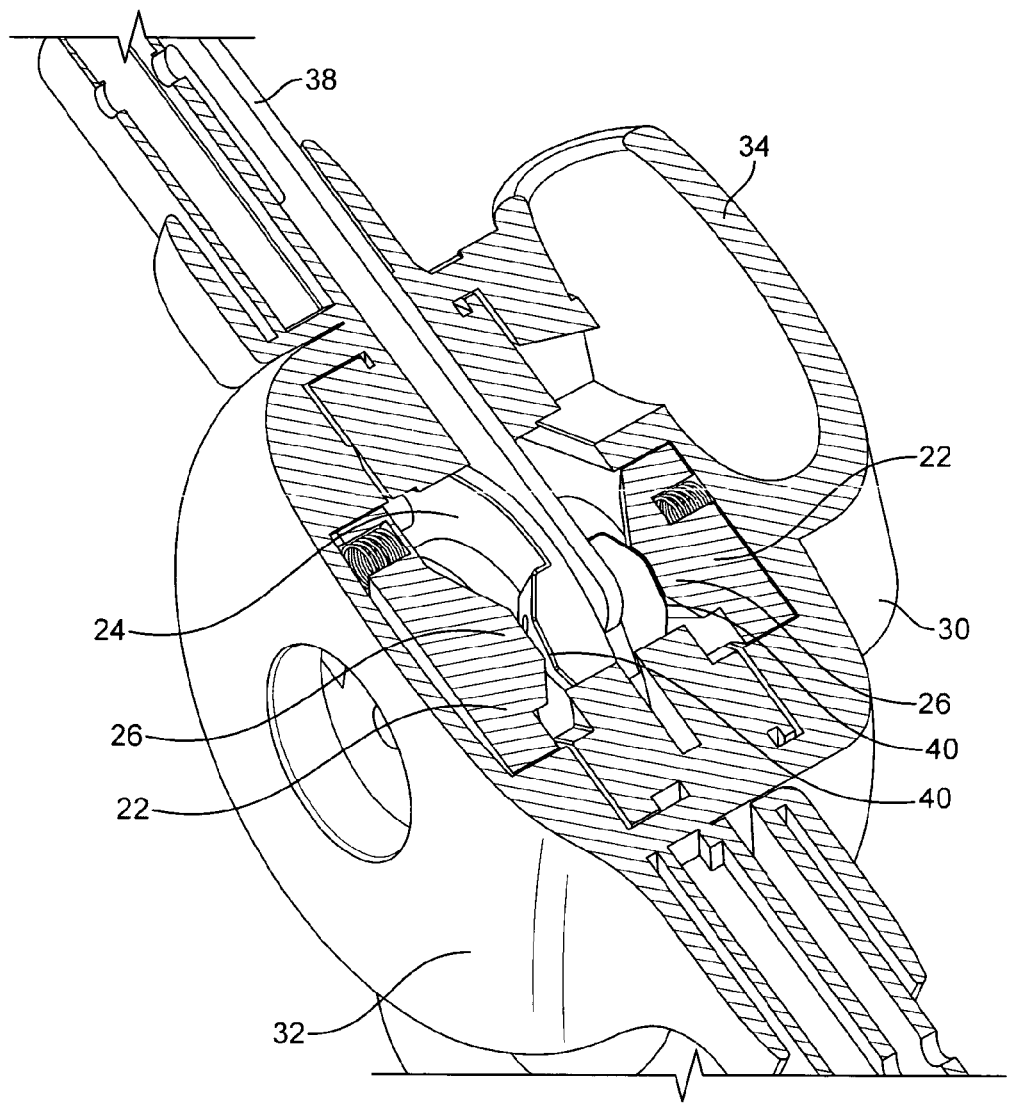
Figure 6:
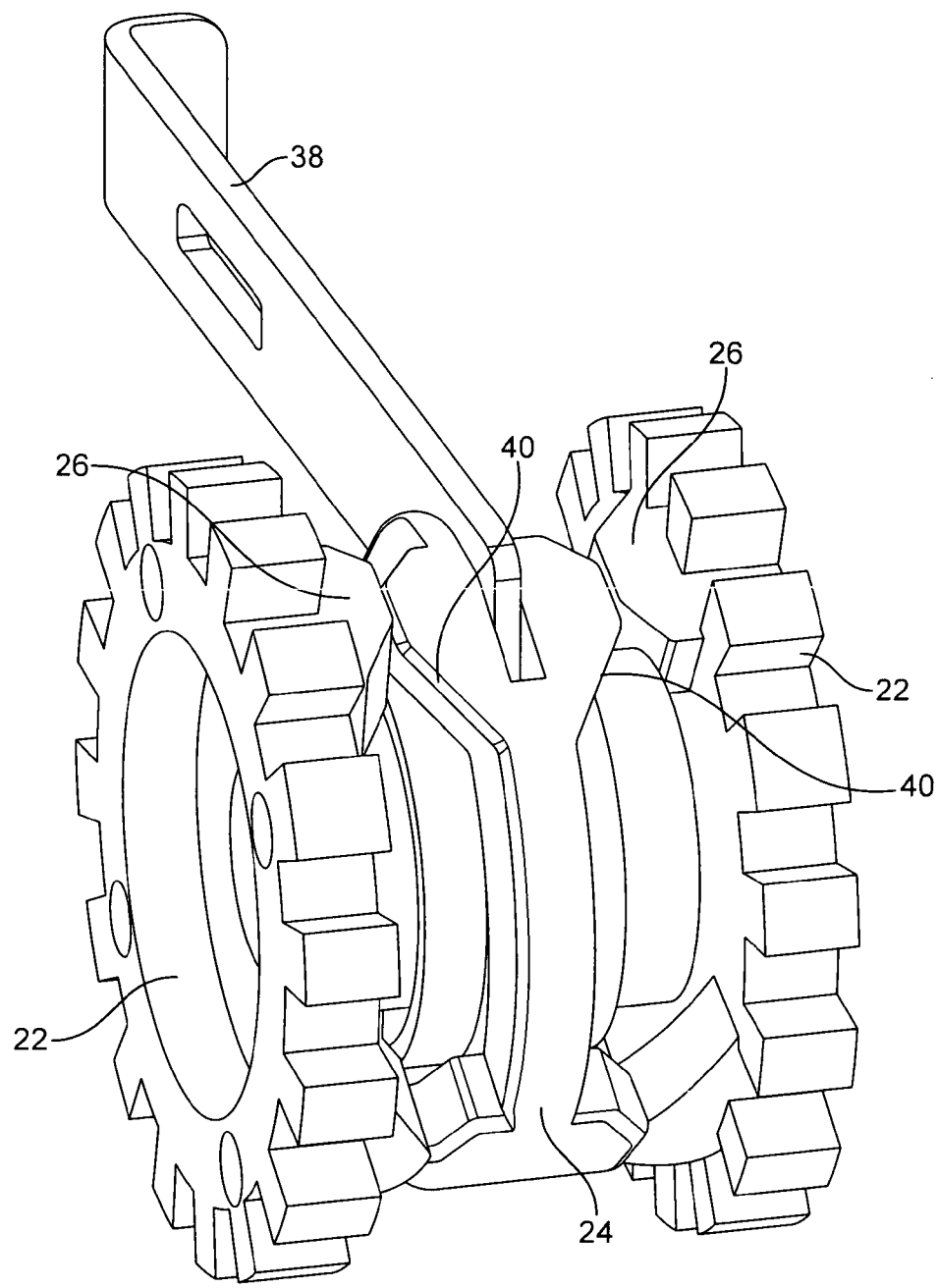
Figure 7:
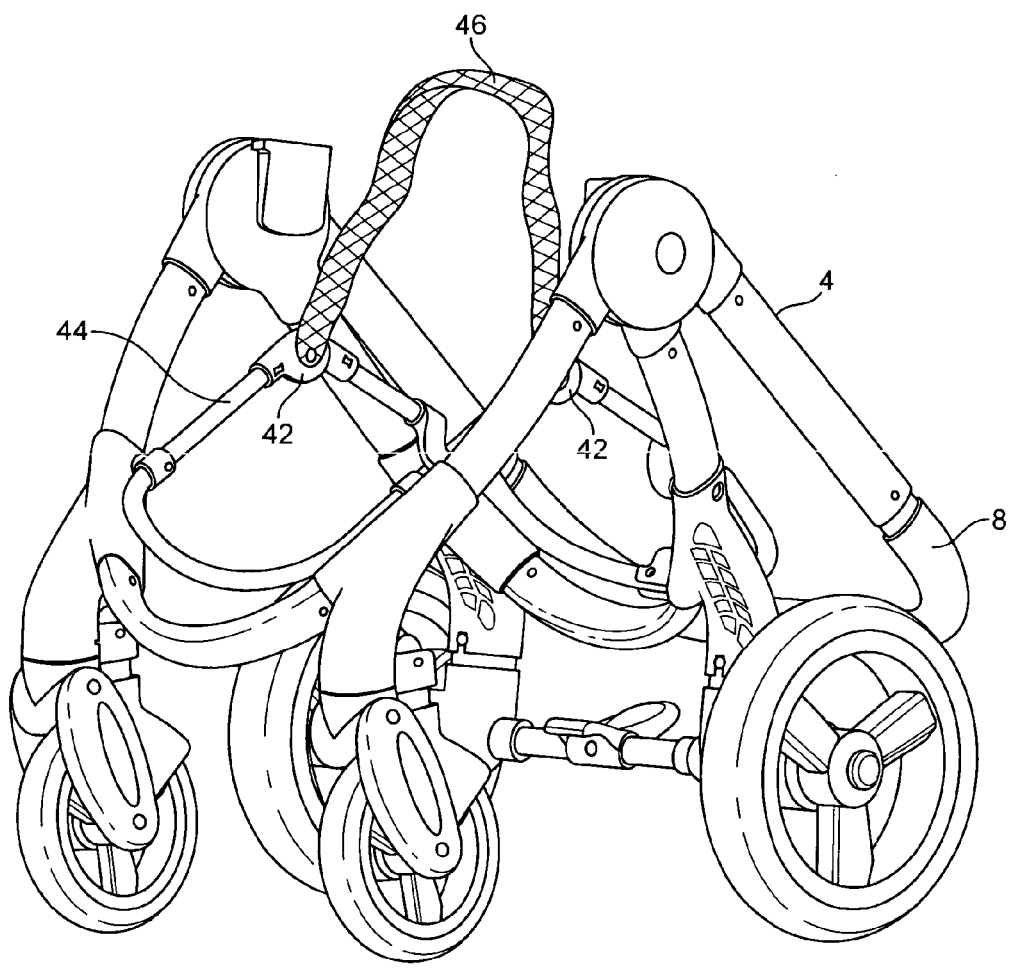
Figure 8:
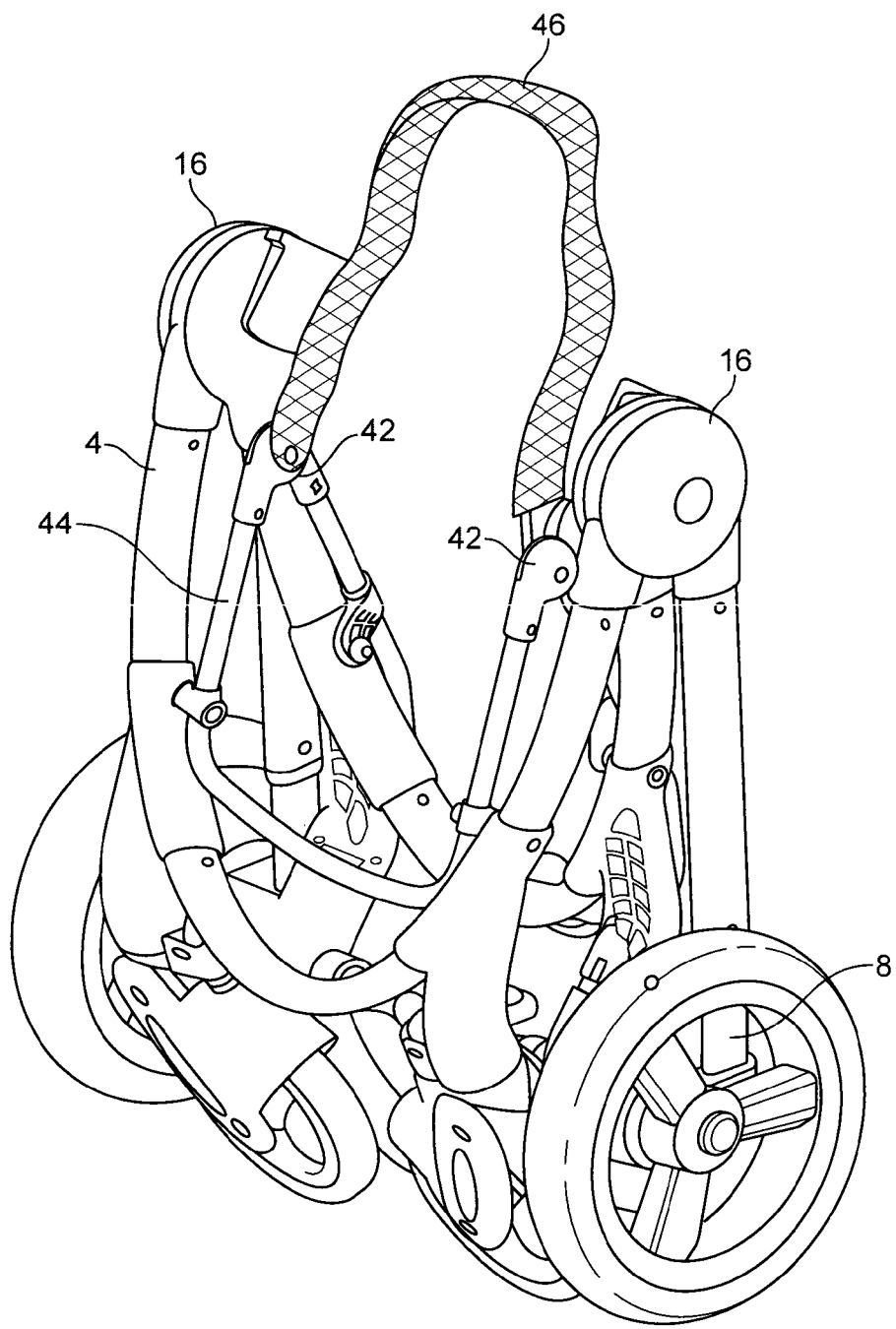
Figure 9:
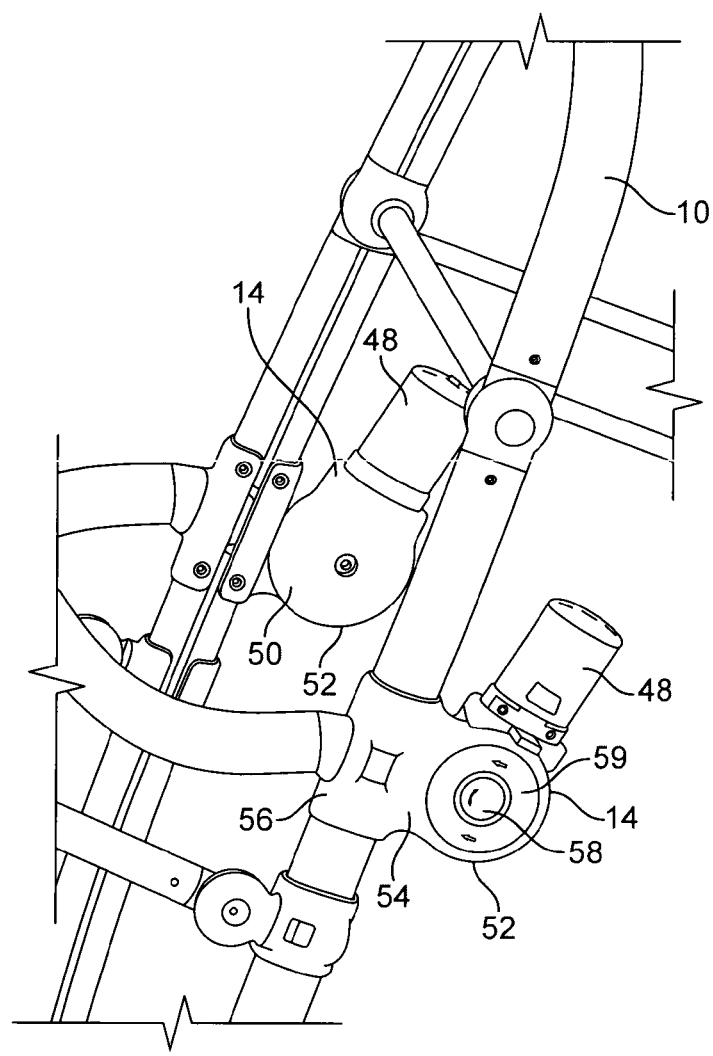
Figure 10:
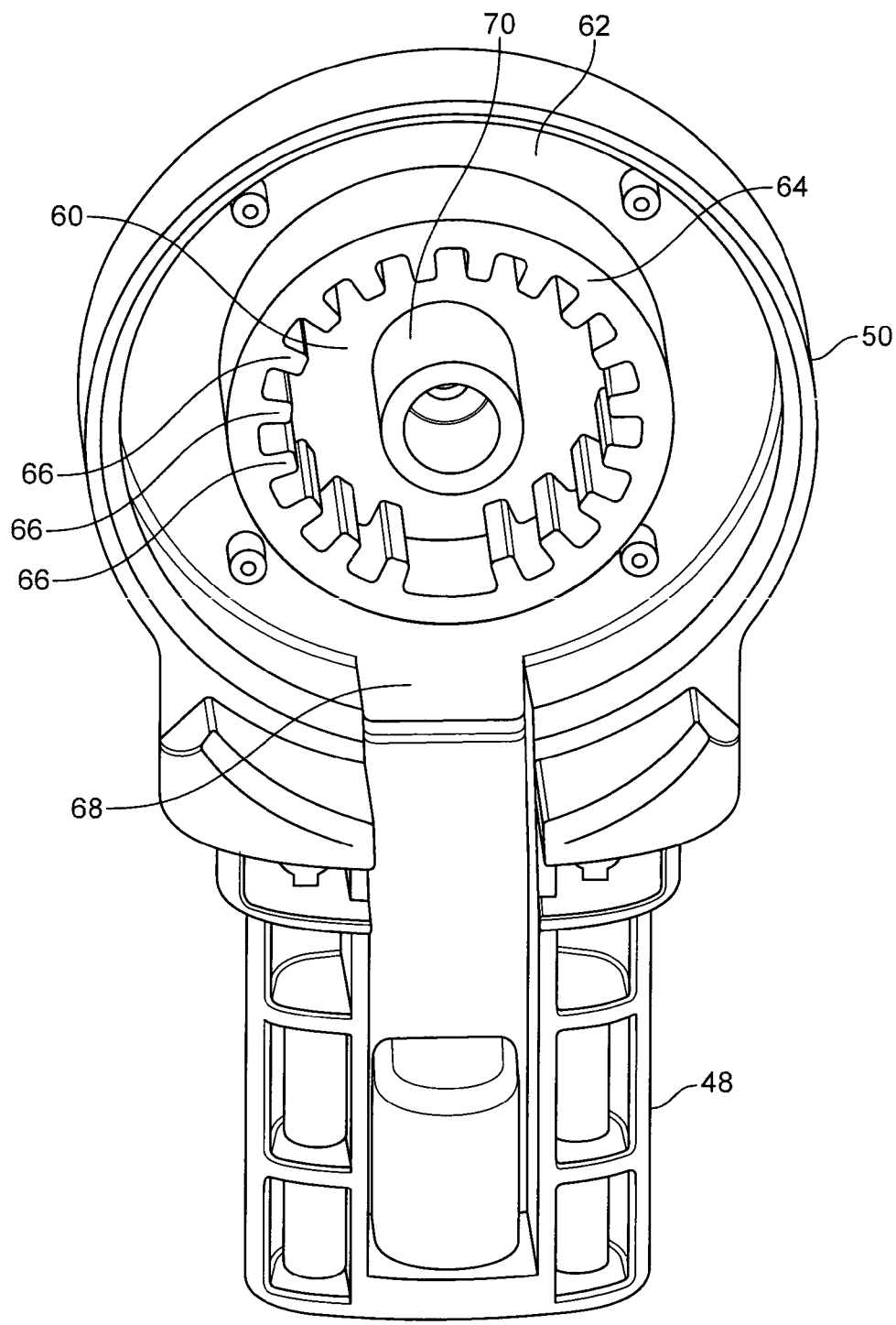
Figure 11:
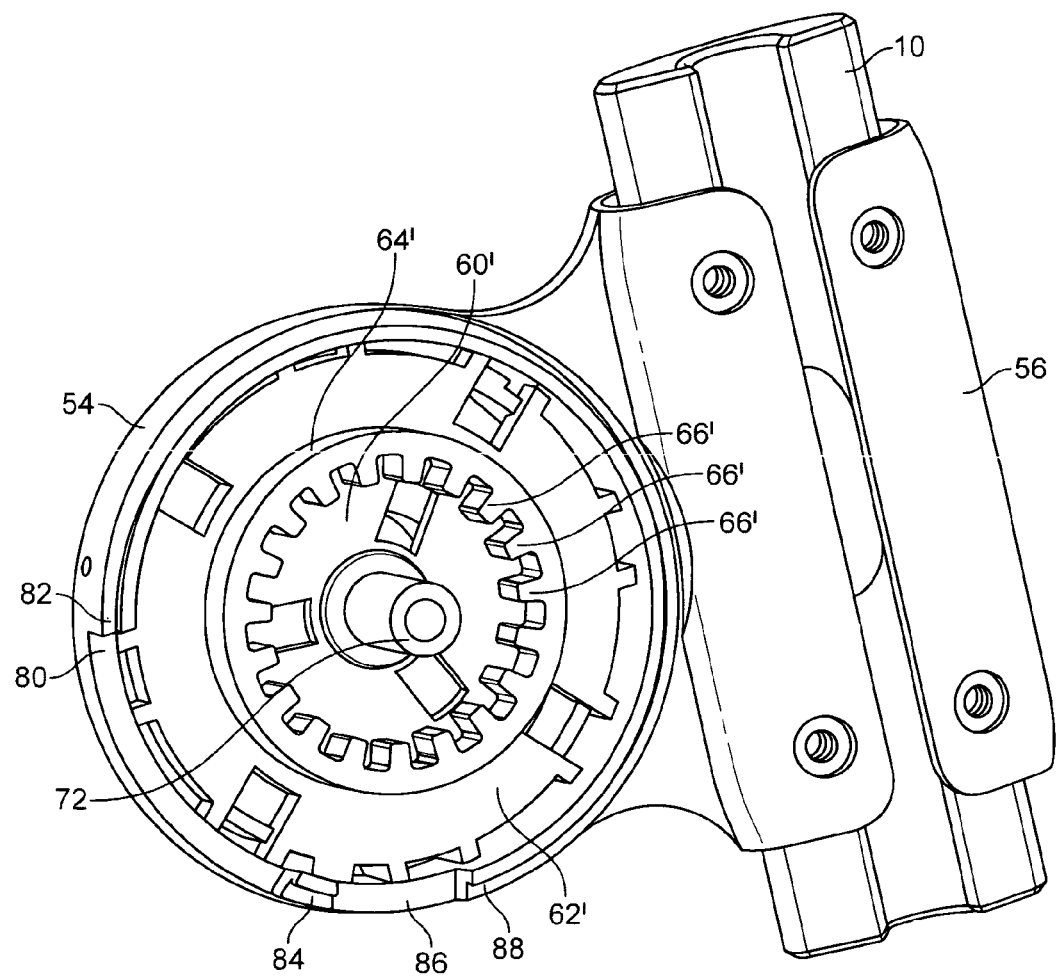
Figure 12:
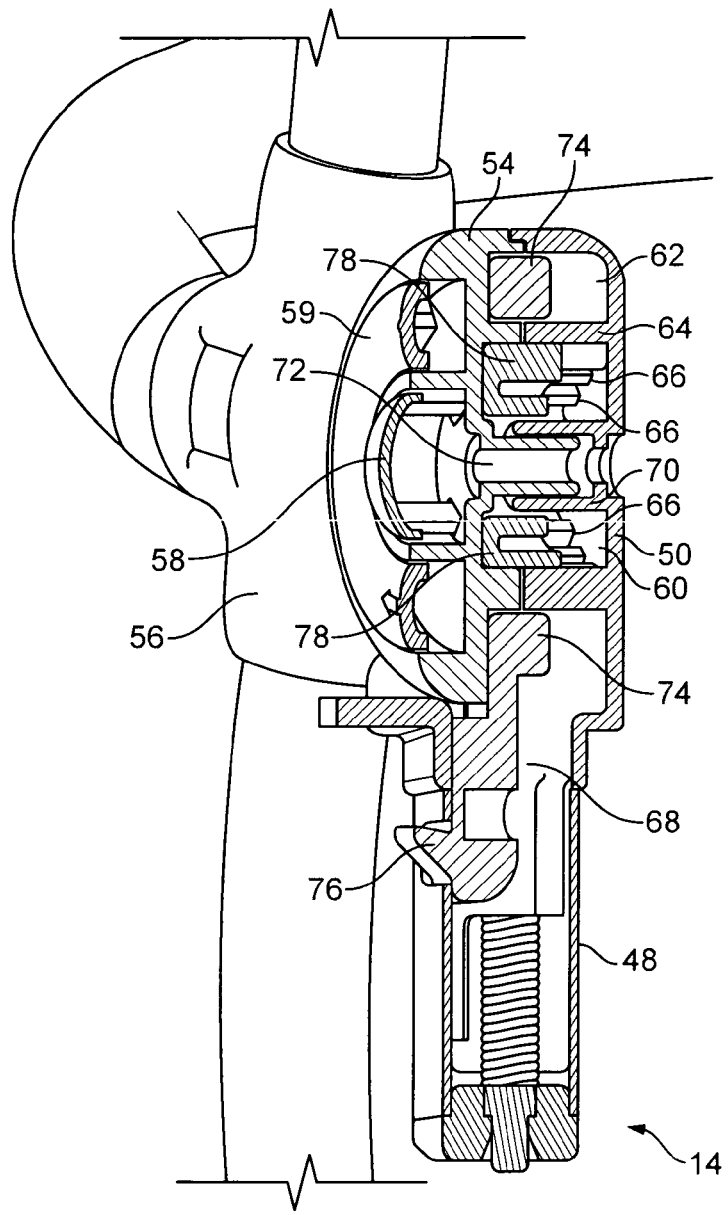
Figure 13A:
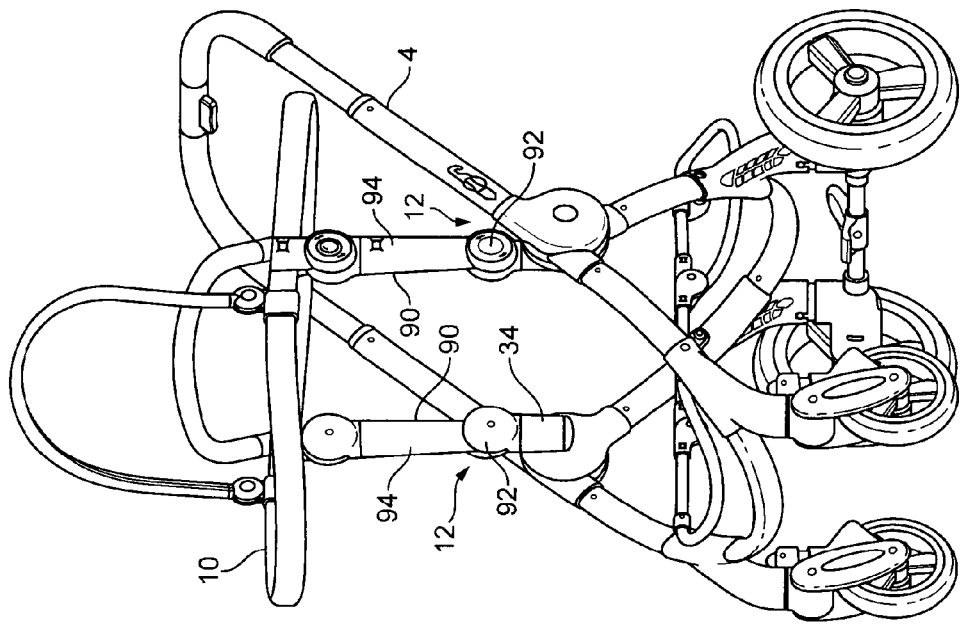
Figure 13B:
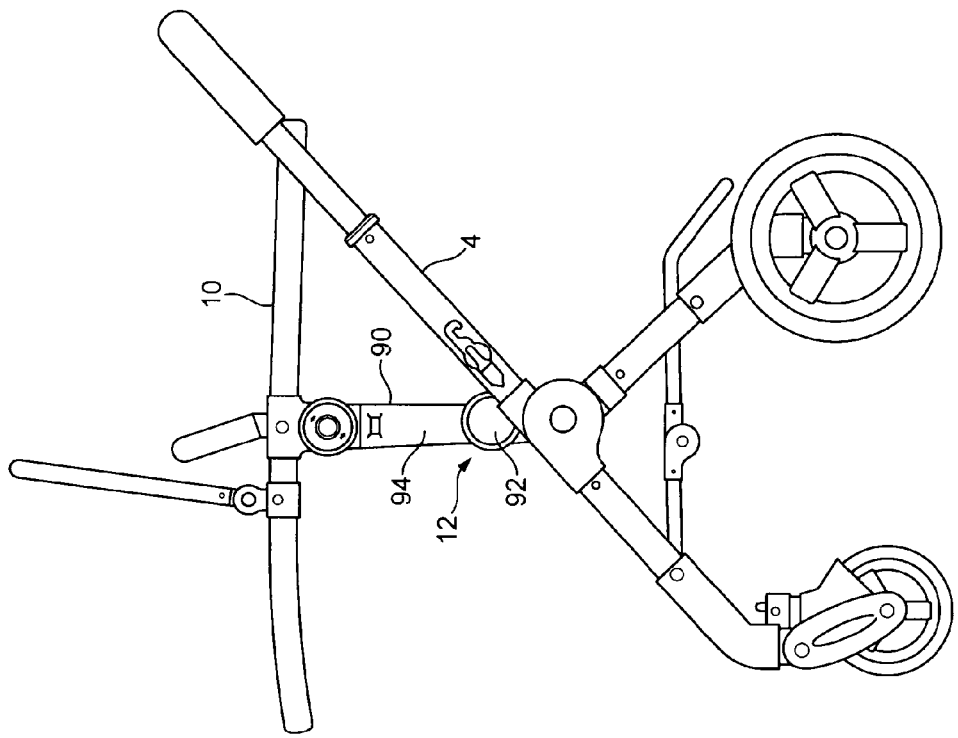
Figure 14:
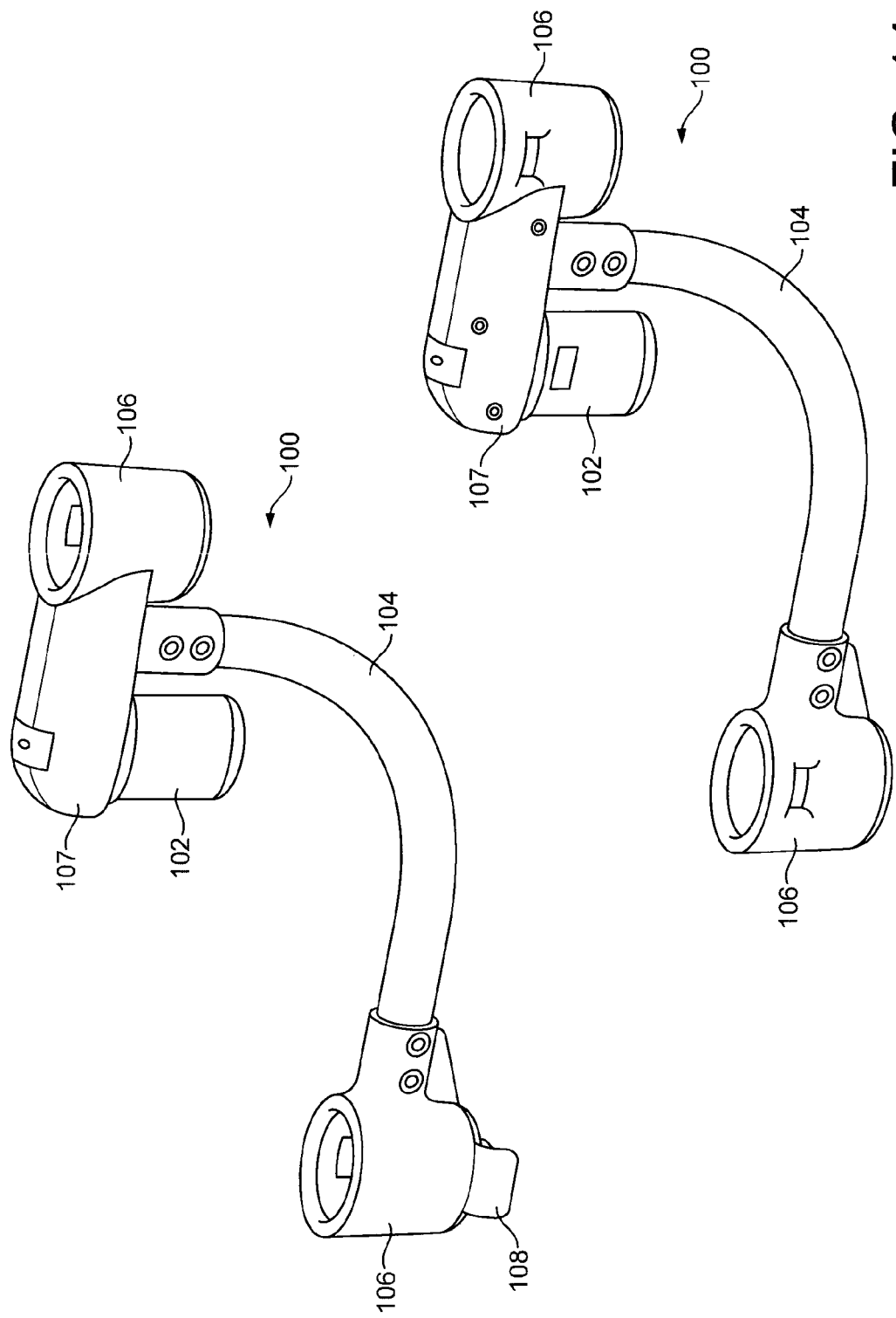
Figure 15:
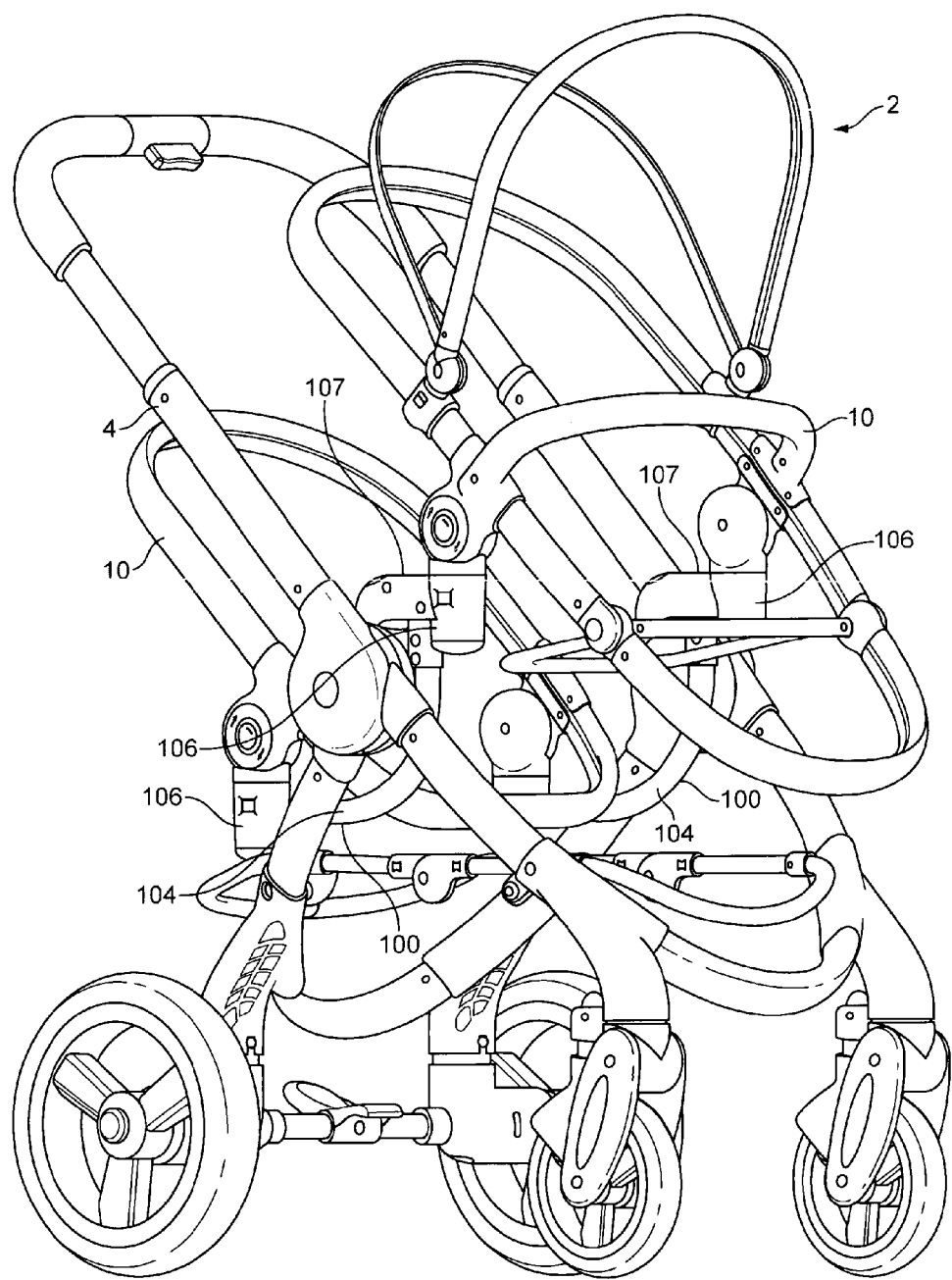
Figure 16:
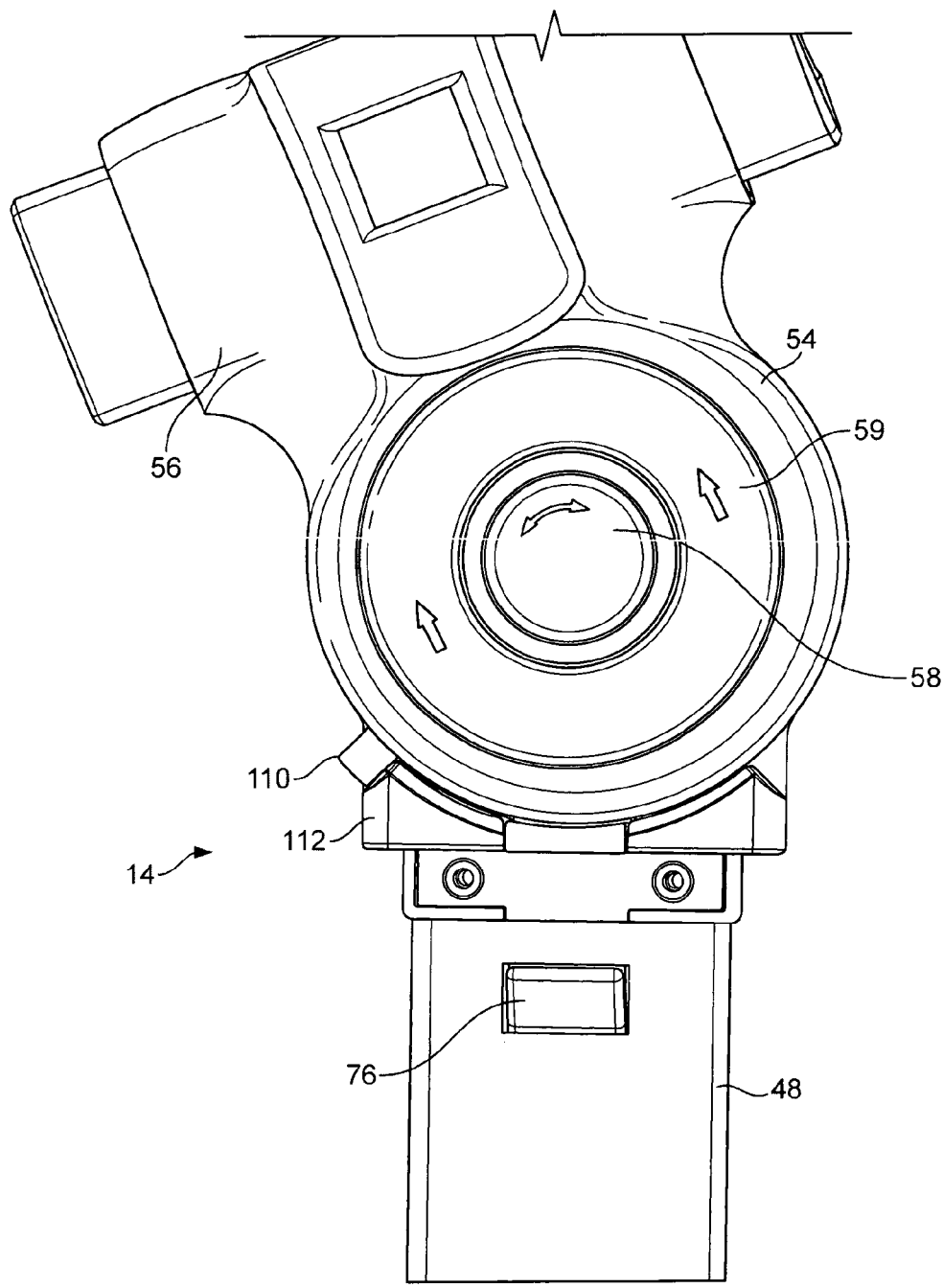
Figure 17:
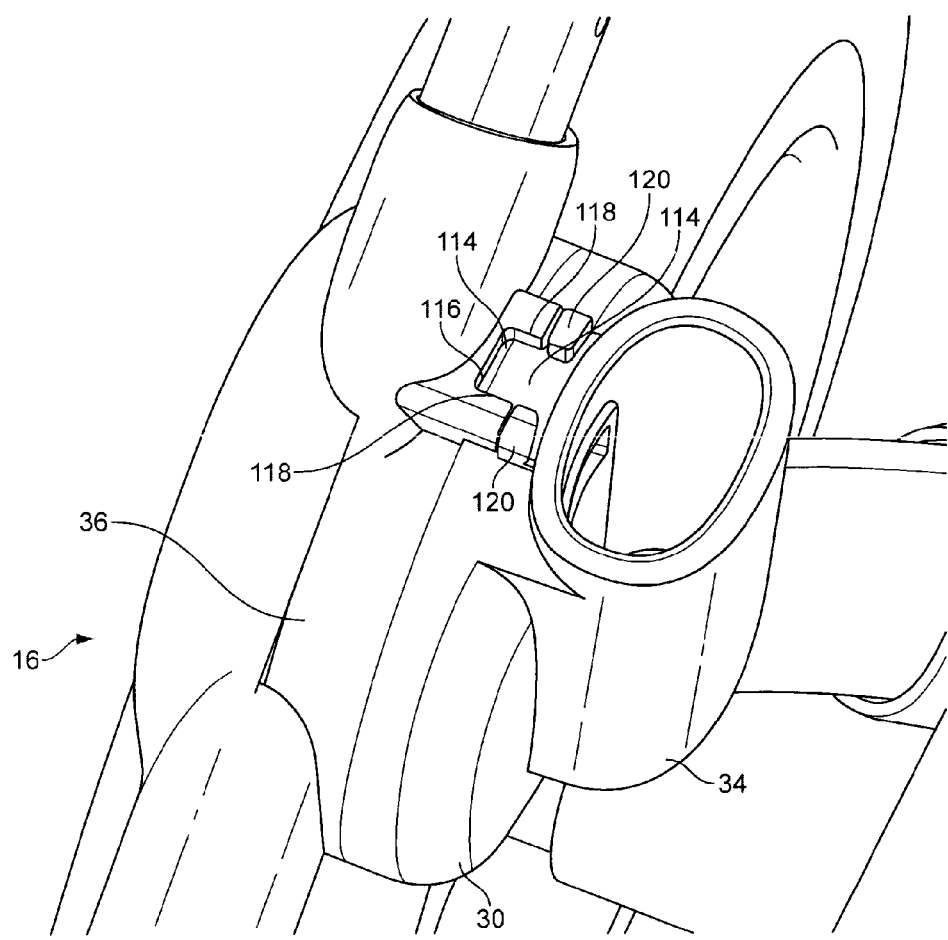
Figure 18:
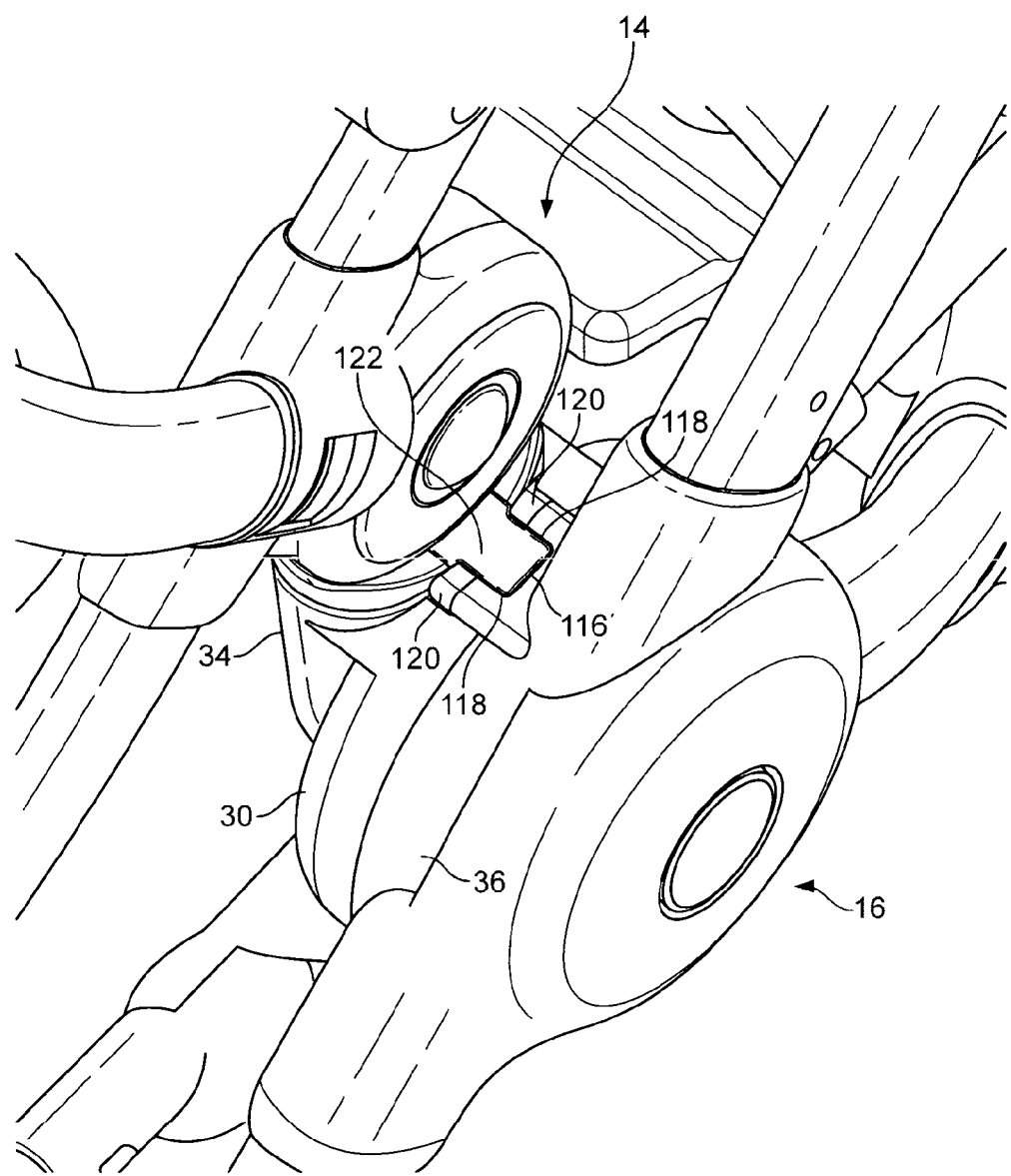

In order that the invention may be clearly and completely disclosed, reference will now be made, by way of example only, to the accompanying drawings, in which:

FIG. 1 is a perspective view of a vehicle with a frame assembly,

FIG. 2 is a perspective sectional view of a hinge device of the frame assembly in a locked position, FIG. 3 is a perspective view of the internal parts of the hinge device in the position shown in FIG. 2, FIG. 4 is a perspective view of the hinge device of FIG. 2, FIG. 5 is a view similar to FIG. 2, but with the hinge device in an unlocked disengaged position, FIG. 6 is a view similar to FIG. 3, but with the hinge device in an unlocked disengaged position, FIG. 7 is a perspective view of the frame assembly in a semi-collapsed or semi-folded state, FIG. 8 is a perspective view of the frame assembly in a fully collapsed or fully folded state, FIG. 9 is a perspective view of a frame of a child-carrying unit having mounting devices to releasably connect the unit to a vehicle frame assembly, FIG. 10 is a perspective view of a part of the mounting devices of FIG. 9, FIG. 11 is a view similar to FIG. 10, but of another part of the mounting devices, FIG. 12 is a perspective sectional view of one of the mounting devices of FIG. 9, FIGS. 13a and 13b show respective side and perspective views of the frame assembly with adaptor devices fitted thereto, FIG. 14 is a perspective view from above of component parts forming a sub-frame assembly releasably mountable to the frame assembly, FIG. 15 is a view similar to FIG. 1, but with the component parts of FIG. 11 connected to the frame assembly as a sub-frame assembly, FIG. 16 is a side view of a mounting device similar to that of FIG. 9, but for mounting on the sub-frame assembly of FIG. 11, FIG. 17 is a perspective view of the hinge device and a safety feature thereof, and FIG. 18 is a view similar to FIG. 17, but with a mounting device mounted on the frame assembly.

Referring to FIG. 1, a vehicle 2 for transporting children comprises a frame assembly 4, a plurality of ground-contacting wheels 6 attached to the frame assembly 4, and a handle 8 for grasping by the controller of the vehicle 2. The handle 8 is a substantially inverted U-shaped member telescopically attached to the frame assembly 4. A foot brake 5 is fitted to act upon the larger diameter rear wheels 6. The vehicle also includes a child-carrying unit in the form of a seat 10 releasably mounted to the frame assembly 4 at a pair of mounting regions 12 by way of a corresponding pair of mounting devices 14 connected to the frame of the seat 10. The child-carrying unit may alternatively be an infant car seat or a carry-cot, for example.

It is to be noted that, for ease of viewing the various constituent parts, no textile materials are shown in these Figures.

The frame assembly 4 further includes a pair of main hinge devices 16, one on each side of the frame assembly 4. The upper portion of the frame assembly above the hinge devices 16 comprising the handle 8 is able to turn about a substantially horizontal axis 18 in such a manner that upon being put into an unlocked condition, described hereinafter, the upper portion of the frame assembly 4 is movable about the axis 18 and downwardly through a substantially vertical plane to convert the frame assembly 4 from an erected state, as shown in FIG. 1, to a semi-folded state, similar to that shown in FIG. 7.

The lower portion of the frame assembly 4 below the hinge devices 16 comprises a forward-projecting frame sub-portion 18 and a rearward-projecting frame sub-portion 20, to which the wheels 6 are attached. The frame sub-portions 18 and 20, without the wheels 6 attached, are substantially identical. Thus, both frame sub-portions 18 and 20 can be manufactured from the same tooling and moulds. This even applies to the common mouldings 19 by way of which the wheels 6 are connected to the frame assembly 4 and which are substantially identical.

Referring to FIGS. 2 to 4 the hinge device 16 is shown in the engaged, locked and erected position, as also shown in FIG. 1. The hinge devices 16 comprise first and second lateral locking hub devices 22 and a third central locking hub device 24 interposed between the lateral locking hub devices 22.

The lateral locking hub devices 22 have inwardly projecting lugs 26 which loosely interdigitate with recesses 28 in the periphery of the central locking hub device 24. Resilient devices in the form of compression springs (not shown) urge the lateral locking hub devices 22 towards the central locking hub device 24. The locking hub devices 22, 24 are housed within housings, the inner lateral locking hub device 22 being housed within an inner housing 30 which connects to the rearward-projecting frame sub-portion 20 and outer lateral locking hub device 22 being housed in an outer housing 32 which connects to the forward-projecting frame sub-portion 18. A receptor cup 34 attached to the inner housing 30 forms a part of the mounting region 12. The inner housing 30 and the outer housing 32 are capable of rotational movement relative to a central housing 36 (shown in FIG. 4), which connects the upper portion of the frame assembly 4 incorporating the handle 8 to the hinge device 16, the central housing itself being capable of rotational movement about the axis 18 relative to the inner and outer housings 30 and 32.

Attached to the central locking hub 24 is an actuating lever 38 which extends upwardly through the tubular frame-work of the upper part of the frame assembly 4. The actuating lever 38 is actuated by pushing the handle 8 downwardly via the telescopic connection with the remainder of frame assembly. This actuation causes the central locking hub 24 to rotate clockwise about the axis 18. At the periphery of the central locking hub device 24, between the recesses 28, there are respective opposite outwardly projecting ramped portions 40 which during rotation abut and slide over correspondingly ramped portions of the inward projections 26 of the lateral locking hub devices 22.

As the central locking hub device 24 is rotated and the respective ramped surfaces abut and move past each other, the lateral locking hub devices 22 are displaced laterally outwardly against the bias of the resilient devices into an unlocked, disengaged position. At the maximum amount of rotation of the central locking hub device 24, substantially flat surfaces at the tops of the respective ramped portions abut each other. This position is shown in FIGS. 5 and 6. In this position, the central housing 36 can be rotated about the axis 18 and the upper part of the frame assembly 4 above the hinge devices 16 which incorporates the handle 8 can be moved downwardly, as previously mentioned, to create a semi-folded condition of the frame assembly 4, as shown in FIG. 7. The lateral locking hub devices 22 are retained within the respective inner and outer housings 30,32 when the dis-engaged position is maintained. The lateral locking hub devices 22 and the central locking hub device 24 re-engage and lock under the urging pressure of the resilient devices when the inner, outer and central housings 30, 32, 36 are brought into the erected vehicle position. The strength of the hinge devices 16 is due to a "load shedding" which is spread evenly around the inner circumferences of the aforementioned three housings.

The final stage in reaching a fully folded condition of the frame assembly 4 requires the release of secondary locks in the form of secondary hinge devices 42 located at respective opposite sides of a secondary frame assembly in the form of a basket frame 44 attached to the frame assembly 4. The secondary hinge devices a turnable and thus unlocked by pulling upwardly on a strap 46, each end of which is attached to respective secondary hinge devices 42.

Continued upward pulling of the strap 46 results in the complete folding of the frame assembly 4, this folded position of the frame assembly 4 being shown in FIG. 8. the upward movement of the secondary hinge devices 42 in the complete folding of the basket frame 44 causes the inner and outer housings 30 and 32 of the hinge devices 16 to rotate about the axis 18 in opposite directions relative to the central housing 36.

When the frame assembly 4 is in the erected condition of FIG. 1, the strap 46 simply lies in the basket supported by the basket frame 44.

In addition, when the frame assembly is in the fully folded position of FIG. 8, the strap 46 can be used, by the controller of the vehicle 2, to carry the folded vehicle on a shoulder of the controller, which is particularly advantageous when using public transport, for instance.

Furthermore, the strap 46 allows the relatively rapid and simple folding of the frame assembly 4 without the need for a great deal of bending over or crouching by the controller of the vehicle or the manipulation of a number of component parts.

The folding of the frame assembly 4 occurs in the absence of the child-carrying unit, which is detached for that purpose.

Referring to FIG. 9, the frame of the seat 10 comprises the mounting devices 14, portions of which are seen in FIG. 1. The mounting devices comprise a connecting leg 48 for releasably mounting the seat 10 to the frame assembly 4, the connecting leg 48 being inserted into the receptor cup 34 of the inner housing 30 of the hinge device 16. The connecting leg 48 is connected to a first part 50 of a rotatable hub assembly 52, also shown in FIG. 10. A second part 54 of the hub assembly 52 includes a bracket 56 for fixing to the frame of the seat 10, and is shown in FIG. 11. The first and second parts 50, 54 are rotatable relative to each other upon actuation of an actuating device. The second part 54 comprises a single actuating region.

An actuating device 58 in the form of a central depressible button serves to operate one operational aspect of the mounting device 14. Surrounding the central button 58 is a further actuating button 59 of a ring-form serving to operate a further operational aspect of the mounting device 14.

Referring to FIGS. 10 and 11, the first part 50 includes inner 60 and outer 62 annular channels separated by an annular wall 64 having a plurality of radially inwardly projecting teeth 66. There ids also a substantially straight channel 68 extending from the outer annular channel 62 into the connecting leg 48. Disposed inwardly of the inner annular channel 60 is a fixing plug 70 for receiving a fixing pin 72 of the second part 54 by a push-fit connection. A toothed cog wheel (not shown) is mounted on the pin-in-plug connection. The second part 54 has corresponding inner 60' and outer 62' annular channels, a corresponding annular wall 64' and corresponding radially inwardly projecting teeth 66'.

The teeth of the cog wheel correspond to the spaces between the teeth 66, 66' of the first and second parts 50, 54.

The outer annular channels 62, 62' and the substantially straight channel 68 house a key-shaped element 74 which terminates in the channel 68 with a retractable detent 76 (see FIG. 12), which projects through a hole in the connecting leg 48 and which serves to releasably mount the seat 10 to the frame assembly 4.

Referring specifically to FIG. 12, when the central button 58, which operates the reclining of the child carrying unit in relation to the mounting device 14, of the single actuating region is pressed inwardly of the mounting device 14, legs projecting through holes in the base of the inner annular channel 60' press against a surface of the cog wheel 78, the teeth of which in the non-activated state engage between the teeth 66' of the second part 54. Upon full depression of the central button 58, the cog wheel 78 is displaced guidingly along the outer surface of the fixing plug 70 to engage instead with the teeth 66 of the first part 50, thereby allowing the first part 50 to rotate relative to the second part 54 in order to change the recline position of the seat 10 relative to the frame assembly 4. Referring back to FIG. 11, there is a first opening 80 in the peripheral wall of the second part 54 bounded by wall portions 82,84, the circumferential distance of the first opening 80 defining multiple recline positions of the seat 10, in this example there are three recline positions, set by rotating the second part 54 relative to the first part 50 which is fixed in place at the mounting region 12.

Referring specifically again to FIG. 12, when the ring-form button 59 of the single actuating region, which operates the releasing of the mounting device 14, is depressed inwardly of the mounting device 14, legs similar to those of the central button 58 project through holes in the base of the outer annular channel 62' and impinge upon the surface of the key-shaped element 74. When the ring-form button 59 is fully depressed, the detent 76 is retracted back through the hole in the connecting leg 48 from its normal locking position to a retracted releasing position within the substantially straight channel 68, allowing the connecting leg 48 to be removed from the receptor cup 34 and removal of the seat 10 from the frame assembly 4.

In this way, the separate functions of release and recline are conveniently located in a single actuating region and require relatively few operating parts. The single actuating region also offers a greater safety feature, now described.

Referring to FIGS. 9 to 12, and in particular to FIG. 11, the peripheral wall of the second part 54 includes a second opening 86, smaller than the first opening 80, and bounded by the wall portion 84 on one side and a further wall portion 88 on the other side. The presence of the second opening 86 ensures that when both the central button 58 and the ring-form button 59 are depressed simultaneously, a position of the first part 50 relative to the second part 54 can be achieved where the connecting leg 48 extends almost parallelly to the main seating frame of the seat 10. This feature has the advantage that a box of smaller than conventional size can be used to transport and store the child-carrying unit to which the mounting device 14 is attached. It is to be noted that this position can only be obtained by the simultaneous operation of the central button and the ring-form button 59, thus preventing the inadvertent or accidental obtaining of such a position when the seat 10 is fixed to the frame assembly 4, where the seat may go into a substantially vertical orientation, increasing the risk that any child in the seat could fall out.

Referring to FIGS. 13a and 13b, the frame assembly 4 is provided at each of the mounting regions 12 with an adaptor device 90. The adaptor devices 90 comprise a connecting leg (not shown) substantially identical to the connecting leg 48 of the mounting device 14 previously described, by way of which the adaptor devices 90 are releasably mounted to the receptor cups 34 of the frame assembly 4, a central hub portion 92, which comprises a release button, and an elongate receiving portion 94 terminating at its upper end with a receptor cup, similar to the receptor cups 34 previously described. The elongate receiving portion 94 is at least twice the length of the connecting leg of the adaptor device 90 and extends substantially vertically upwardly. Utilisation of a pair of such adaptor devices 90 allows the child-carrying unit 10, especially one for a very young infant such as a new-born baby, to be raised to an elevated position if desired. This allows a parent using the frame assembly to be closer to the infant and also raises the infant from the lower level pollution zone created by exhaust fumes from motor vehicles.

Referring to FIG. 14, two interface portion components 100 each comprise a further connecting leg 102 releasably mountable to the respective receptor cups 34 of the frame assembly 4, a downwardly curved bar 104, and two connector sockets 106 for receiving two child-carrying units in the form of the seat 10 or infant car seats and carry-cots, or a combination thereof.

When the interface portion components 100 are attached to the frame assembly 4 they form a sub-frame of the frame assembly 4, and when the child-carrying units are mounted thereon, one behind the other, they are in a compact echelon formation, one of the connector sockets 106 of each component 100 being at a higher level in relation to the ground than the other connector sockets 106. The higher connector socket 106 and further connecting leg 102 are both connected to respective opposite ends of an upper mounting piece 107.

In addition, on the inner side of the lower connector sockets 106 there is a downwardly curved lug 108 which serves to rest upon a part of the basket frame 44, such that the weight of two infants is fully supported by the frame assembly 4. A similar sub-frame arrangement is disclosed in WO 2008/040797.

Furthermore, it would be possible to readily change the distance between the lower and higher connector sockets 106 of each component 100 with an adjusting device. Such adjusting device could take the form of a telescopic upper mounting piece whereby the horizontal distance between the connector sockets 106 of each component 100 could be readily changed. Alternatively, by a similar arrangement, the vertical distance between the connector sockets 106 could be readily changed.

Such adjustment is advantageous in prolonging the useful life of the vehicle 2, as it will "grow" with the infants being transported by it, and whom will remain comfortably accommodated. However, the adjustment must be kept within safe limits, such that the child-carrying units remain as close to the centre of gravity of the vehicle 2 as possible to prevent any possibility of dangerous tilting or toppling over of the vehicle 2.

FIG. 15 shows the components 100 mounted on the frame assembly 4 as a sub-frame assembly for the releasable mounting of two seats 10 in the connector sockets 106 in the echelon formation, one behind the other.

The good stability of the vehicle 2 in the double carriage arrangement is also maintained by restricting the rotational movement of the mounting units 14, the connector legs 48 being insertable in the connector sockets 106 of the interface portion components 100. Referring to FIG. 16, this restricted rotational movement is achieved by the addition of a restrictor pin 110 insertable into the opening 80 of the second part 54. A head portion of the pin 110 projects outwardly of the opening 80 and, during rotation of the first and second parts 50,54 relative to each other, will abut a mechanical stop 112 of the mounting device 14.

Referring to FIGS. 17 and 18, a further safety feature of the vehicle 2 is illustrated. The inner housing 30 and the central housing 36 of the hinge device 16 include at their outer peripheral surfaces respective channel sections 114, the channel section of the inner housing 30 being narrower than that of the central housing 36. The channel section 114 of the central housing 36 is defined by an end wall 116 and two side walls 118 extending substantially parallelly to each other toward and across the boundary with the inner housing 30. A substantial part of the walls 118 extend over the surface of the inner housing 30 and, when the frame is in the erected condition (as shown in FIG. 1), align with narrow wall portions 120 of the inner housing 30. In this condition, the channel sections 114 define a channel of rectangular form, open at its inner end adjacent the receptor cup 34. When a child-carrying unit is releasably mounted in the receptor cup 34, a projecting lug 122 of the mounting device 14 is closely received in the channel. If the handle 8 is accidentally or inadvertently pushed downwardly as previously described, whilst the frame assembly is in the erected position, so that the hinge device 16 is dis-engaged for turning about the axis 18, the presence of the lug 122 prevents any dangerous folding of the handle 8 by relative movement between the inner housing 30 and central housing 36 to which the handle 8 is connected. Such prevention of folding is due to the abutment of the walls 118 against the edge of the lug 122, especially that part where the walls 118 overlap the inner housing 30.

The invention claimed is:

1. Apparatus comprising a vehicle pushchair frame assembly including a hinge device having a hinge axis, said hinge device having first and second hub devices moveable co-axially with respect to said hinge axis and a third hub device interposed between the first and second hub devices and moveable about said hinge axis, the first and second hub devices releasably engage with the third hub device for locking said vehicle frame assembly in an erected condition, wherein the first and second hub devices have inwardly-projecting lugs about their periphery and said third hub device includes at its periphery recesses, said recesses and said inwardly-projecting lugs arranged to loosely interdigitate in the erected condition, and wherein said inwardly-projecting lugs comprise inwardly-projecting ramped portions and said third hub device comprises, bounding said recesses, corresponding outwardly-projecting ramped surface portions, the arrangement being such that the first and second hub devices are moveable as aforesaid by movement of the third hub device about said hinge axis.

2. Apparatus according to claim 1, wherein said first and second hub devices are laterally disposed on respective opposite sides of said third hub device.

3. Apparatus according to claim 1, and further comprising a resilient device serving to urge said first and second hub devices towards said third hub device.

4. Apparatus according to claim 1, and further comprising a releasing mechanism connected to said third central hub device, said releasing mechanism being connected to a handle portion of said frame assembly.

5. Apparatus according to claim 4, wherein the first, second and third hub devices are housed in respective inner, outer and central housings of said hinge device, the central housing being connected to said handle portion.

6. A method comprising providing a vehicle pushchair frame assembly, locking the assembly in an erected condition, said locking including causing first and second hub devices of a hinge device of the frame assembly to engage releasably a third hub device interposed between the first and second hub devices, wherein the first and second hub devices have inwardly-projecting lugs about their periphery and said third hub device includes at its periphery recesses, said recesses and said inwardly-projecting lugs arranged to loosely interdigitate in the erected condition, and wherein said inwardly-projecting lugs comprise inwardly-projecting ramped portions and said third hub device comprises, bounding said recesses, corresponding outwardly-projecting ramped surface portions and unlocking the assembly by causing movement of said third hub device about a hinge axis thereby causing movement of the first and second hub devices co-axially with respect to said hinge axis, such movement of the hub devices releasing the first and second hub devices from a locking engagement with the third hub device.

7. A method according to claim 6, wherein said first and second hub devices are urged towards said third hub device by way of a resilient device.

8. A method according to claim 6, wherein said unlocking includes actuating a releasing mechanism attached to said third hub device to cause its movement about said hinge axis, and wherein said actuating includes operating a handle portion of said frame assembly connected to said releasing mechanism.

9. A method according to claim 6, wherein during said unlocking, the first and second hub devices move co-axially away from each other against the urging of said resilient device so that they no longer lockably engage with said third hub device.

10. A method according to claim 6, wherein said releasing enables said hinge device to be rotated about its axis of rotation and said frame assembly can be converted into a non-erected condition.

* * * * *